United States Patent [19]

Koster

[11] 4,417,940

[45] Nov. 29, 1983

[54] SPLICER FOR LABEL FEEDER

[75] Inventor: Harry D. Koster, Breckenridge Hills, Mo.

[73] Assignee: Chemical Dynamics, Inc., St. Louis, Mo.

[21] Appl. No.: 229,509

[22] Filed: Jan. 29, 1981

[51] Int. Cl.[3] .............................................. B32B 31/00

[52] U.S. Cl. .................................... 156/351; 156/361; 156/502; 156/505; 242/58.4

[58] Field of Search ............... 156/542, 584, 157, 502, 156/506, 361, 351; 242/58.4

[56] References Cited

U.S. PATENT DOCUMENTS 3,730,811 5/1973 Wendt ........................... 242/58.4 X 4,240,854 12/1980 Massey et al. ...................... 156/157

4,267,004 5/1981 Anderson ........................ 156/584 X

*Primary Examiner*—David A. Simmons

*Attorney, Agent, or Firm*—Rogers, Eilers & Howell

[57] ABSTRACT

A supplemental roll of label-bearing strip and a splicer for that strip are provided for a label feeder of the type which peels labels from a backing strip. A primary label-bearing backing strip is intermittently fed to a peeling edge, the label-free backing strip is pulled back to a feed roll and a rewind roll to form a narrow V space, and the splicer is located within that V space. The leading end of the supplemental roll is spliced to the tail end of the primary roll without delaying the labelling line to which the labels are supplied. An adhesive piece on the leading end of the supplemental roll normally is held within the V space in register with, but out of engagement with, the strip from the primary roll; and it is adhered to the tail end of the primary strip by a pressure device which is controlled by a photoelectric means that is located upstream of the pressure device and that responds to the passage of the tail end of that primary strip. The arrangement can be applied to existing labelling machines without modifying them, and without requiring a significant amount of additional space.

4 Claims, 4 Drawing Figures

SPLICER FOR LABEL FEEDER

BACKGROUND OF THE INVENTION

Label feeding machines have been made in the past having rolls of labels adhered to a backing strip by pressure-sensitive adhesive, and intermittently feeding the label-bearing strip to peeling means where the backing strip is drawn backward off the labels to a drive roll and a rewind roll to permit the labels to be attached to containers being fed along a line. The path of the label-bearing strip from the supply roll to the peeling edge, and the path of the label-free strip back to the feed roll and rewind roll formed a V-space, thus providing a compact arrangement. Those machines had the disadvantage that a considerable down time was required a number of times per day to replace the depleted roll of labels.

To reduce this problem, I initially developed equipment to which I annexed a supplemental roll of labels held on a spindle adjacent the primary supply roll. The leader on that supplemental roll was drawn out into the V-space along the path of the primary label-bearing strip and held by a vacuum block adjacent, but out of contact with, that label-bearing strip. An air cylinder pressure device, which was located opposite the vacuum block and on the other side of the primary label-bearing strip, was actuated by a photoelectric device located downstream of that air cylinder. That photoelectric device sensed when the last label on the backing strip of the primary label-bearing strip had passed that device; and it caused the air cylinder to press the label-free tail of the primary label-bearing strip against an adhesive strip at the leading end of the supplemental label-bearing strip. Then a release was operated on the air cylinder so the supplemental label-bearing strip was then fed to the labelling line of bottles or the like to be labeled.

This equipment was put into experimental operation on the line at the plant of my employer more than a year ago. Its operation had problems, however. The sensing means of the photoelectric device had to be a delayed action type to prevent its responding to the small gap on the backing strip between successive labels. Moreover, when a label happened to be entirely missing from the backing strip, the resulting gap was long enough to permit the photoelectric device to work and thereby cause the leading end of the supplemental label-bearing strip to be spliced onto the middle of the primary label-bearing strip. Also, if the primary label-bearing strip broke, or if the label feeding machine was stopped longer than usual (which can occur for a number of reasons), at a time when a gap between labels was in register with the photoelectric device, the leading end of the supplemental label-bearing strip would be spliced to the middle of the primary label-bearing strip. Furthermore, that equipment had the disadvantage that the photoelectric device had to sense the difference between the light that could be transmitted through the translucent backing strip and ambient or scattered light.

I continued seeking ways to overcome the problems of the machine, and finally within the past year overcame them. I moved the photoelectric device to the position illustrated herein so that it is sensitive to the absence of any strip, and hence responds to the passing of the label-bearing strip from its supporting core. The passing of the tail end of the label-bearing strip beyond the photoelectric device occurs sufficiently far back so the tail end of that strip is yet within range of the pressure device at the time the pressure device works to splice the primary and supplemental strips.

The present arrangement thus overcomes the problems of the earlier experimental parts of the development. Also, it has produced a very compact arrangement and one that can be added as by a kit to existing older machines that have been sold without the supplemental splicing device.

It is recognized that splicing devices have been employed for tapes and the like in the past such as U.S. Pat. Nos. to Mosburger 4,116,399, to Romagnoli 4,172,564, to Giles 3,306,801, to Wendt 3,586,006 and to Catzen 3,489,628, to Shearon 3,891,158, and to others in the same classes and subclasses. However, none of these is as compact or as fully automatic as the present one.

IN THE DRAWINGS

DESCRIPTION OF THE PREFERRED EMBODIMENT

Figure 1:
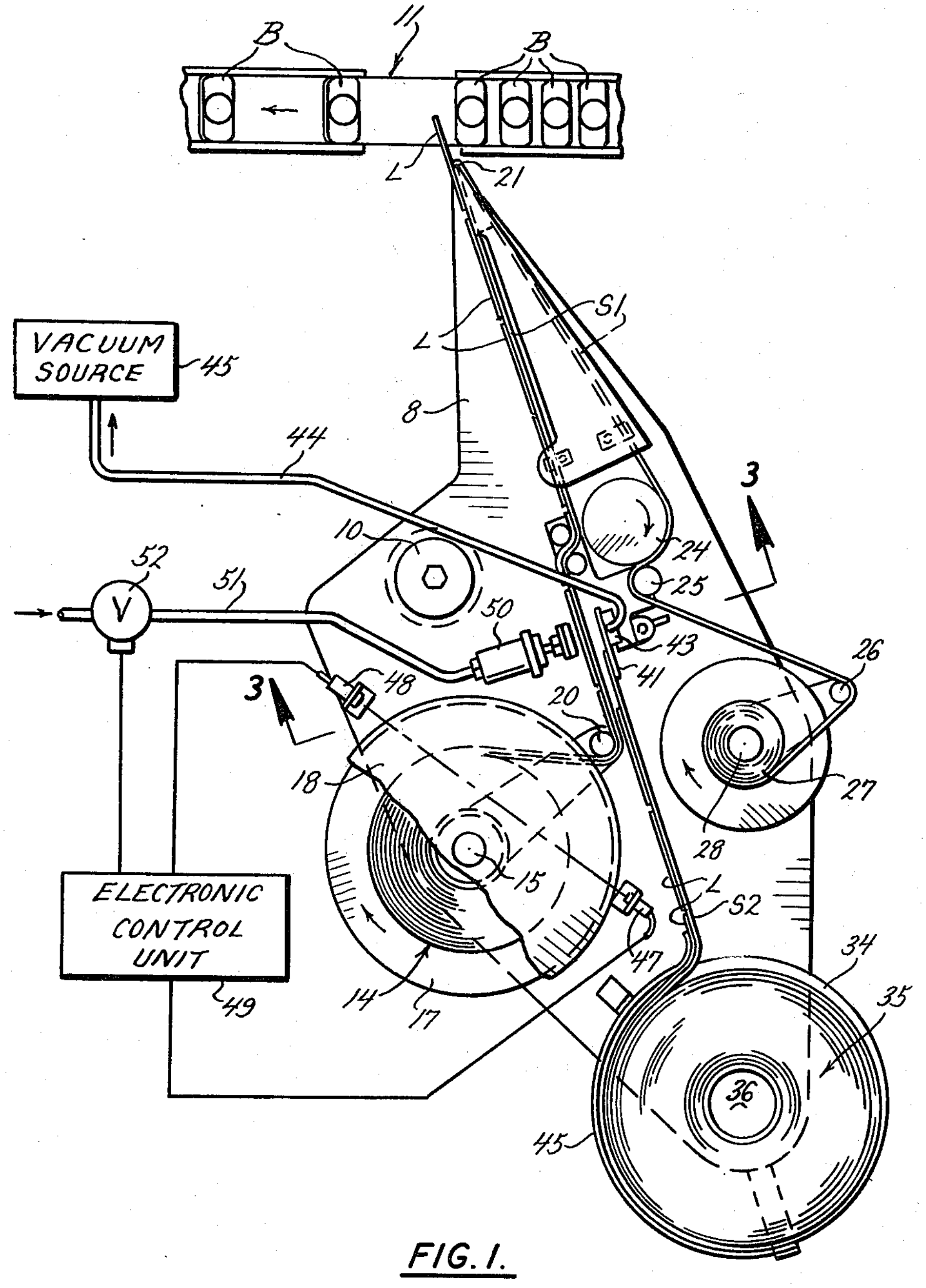
FIG. 1 is a partially-schematic, partially broken-away plan view of a label-peeling machine in which the splicing device of the present invention is incorporated.
Figure 3:
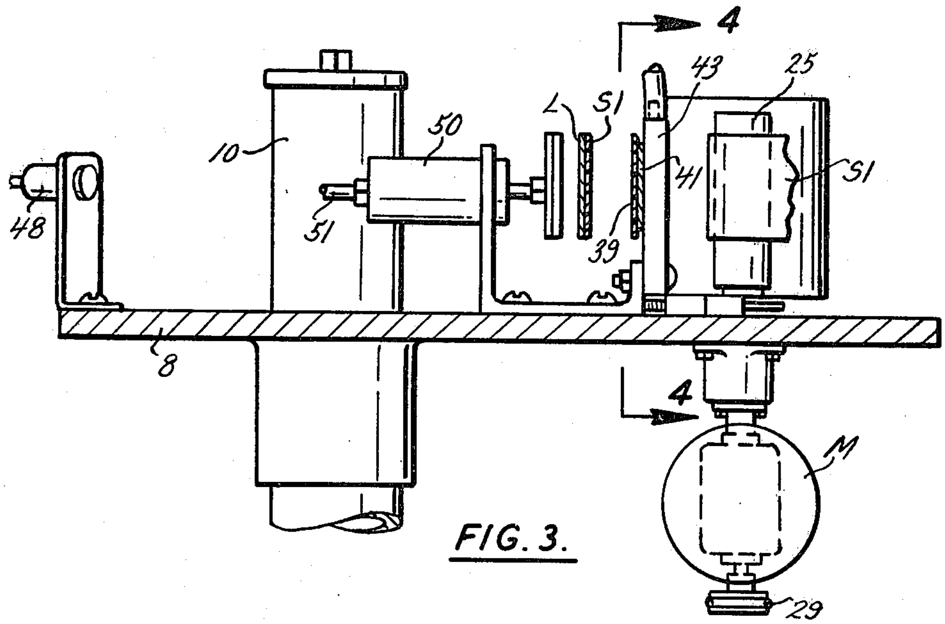
FIG. 3 is a sectional view which is taken along the plane indicated by the line 3—3 in FIG. 1.

The machine includes various parts mounted above the floor on a base 8, which includes a column 10. The present invention is used to supply labels to a labelling line 11 of bottles B fed from right to left in FIGS. 1 and 2.

The primary label feed is from a supply roll 14 of labels L that may be typically paper labels for bottles, adhered by pressure-sensitive adhesive to a somewhat translucent, slick, backing strip S1, usually of paper or plastic material. The supply rolls that are used in the machine of the present invention do not have to have trailing portions of the backing strips S1 thereof free of labels. A shaft 15 is mounted on the base and rotated by a belt 16 connected, as will appear, to a motor M. The shaft 15 supports a lower disc plate 17 upon which the label-bearing strip 14 rests. A top plate 18, that is readily removable, rests by gravity on top of that label-bearing strip.

A guide roll 20 is mounted on a plate which is part of a combination brake and tension-applying device for the shaft 15. The label-bearing strip S1 will normally hold that guide roll and plate in the positions shown by FIG. 1; and, whenever that guide roll and plate are in those positions, that combination brake and tension-applying device will apply a light drag to the shaft 15 which will keep that shaft from rotating freely during the halts between intermediate advancements of the strip. When the tail end of the label-bearing strip S1 leaves the disc plate 17, the guide roll 20 will automatically move in the clockwise direction in FIG. 1 to a position wherein that combination brake and tension-applying device will brake the shaft 15.

Normally, the label-bearing strip S1 is fed intermittently from the supply roll 14 around the guide roll 20 and along a path to a fairly abrupt peeling point 21 that has a vertical edge. Two small guide rolls are shown, between guide roll 20 and point 21, to keep the label-bearing strip vertical as it approaches point 21. At the point 21, the backing strip S1 is bent around the vertical edge in a rather sharp bend and thereby is peeled from the labels. The intermittently-advanced labels then move out in the original direction to a position adjacent the bottle B and, by appropriate means (not shown), are then caused to adhere to those bottles.

Meanwhile the backing strip S1 from which the labels have been peeled is pulled back across a drive roll 24, against which it is frictionally held by a pinch roll 25. Thence it passes guide roll 26 and onto a rewind roll 27. The path of the strip S1 from the supply roll 14 to the peeling point 21, and thence back to the drive roll 24 and rewind roll 27, forms a compact V-space. The motor M drives the drive roll 24 through appropriate gearing. The shaft 28 of the roll 27 is driven from the roll 24 by a belt 29; and the shaft 28 in turn is connected by the belt 16 to drive the supply roll shaft 15. The belt drives are primarily employed to keep the strip taut, and the belts may slip as the diameters of the rolls change and when shaft 15 is braked.

The guide roll 26 is mounted on a plate which is part of a combination brake and tension-applying device for the shaft 28. The label-free strip S1 will normally hold that guide roll and plate in the positions shown by FIG. 1; and, whenever that guide roll and plate are in those positions, that combination brake and tension-applying device will apply a light drag to the shaft 28 which will keep that shaft from rotating freely during the halts between intermittent advancements of the strip. When that guide roll is not restrained by the label-free strip S1, it will automatically move in the clockwise direction in FIG. 1 to a position wherein that combination brake and tension-applying device will free the shaft 28 to rotate to keep that strip taut.

The foregoing constitutes the normal operation of a known machine—not equipped with the splicing device of the present invention—both before and after the roll 14 was depleted of label-bearing strip. However, when that roll was depleted—typically after about forty-five minutes—it was necessary to stop the labelling line entirely, remove the top plate 18 and the core of the depleted roll, place a full roll over the shaft 15, replace the top plate 18, thread the new strip S1 up to the point 21, and then pass the leader of the strip of that full roll around point 21 and beyond the feed roll 24, around the rolls 25 and 26, and secure it to the shaft 28 to enable it to be pulled from the supply roll 14 and rolled up to form the rewind roll 27. By use of the machine provided by the present invention, the labelling line does not have to stop at all.

In the present machine, a supplemental roll 35 of label-bearing strip S2 rests upon a plate 34 that is secured to a shaft 36 which is rotatably mounted on the base 8 near the primary feed roll 14. A drag-applying brake, indicated by the numeral 37, is provided on that shaft to keep it from rotating freely; and hence the strip S2 is kept reasonably taut. Also, a guard 45 is mounted adjacent the roll 35 to keep the turns of that roll from slipping off of the edge of the plate 34.

Figure 4:
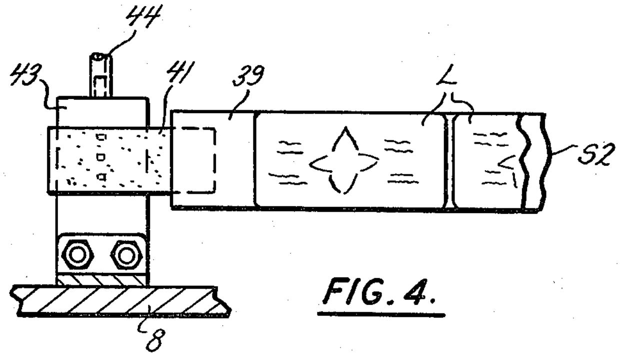
FIG. 4 is a sectional view taken along the plane indicated by the line 4—4 in FIG. 3.

As shown particularly by FIG. 4, there is a leader 39 ahead of the labels L on the strip S2 of the replacement roll 35. A small piece of pressure-sensitive tape 41 is attached to the end of the leader 39 of the strip S2 so it projects beyond the end of that leader and has its adhesive surface directed outwardly of the roll. The strip S2 is then unwound to permit the piece 41 to reach a vacuum block 43 which is located within the V-space. Vacuum can be drawn by a pipe 44 from a Vacuum Source 45; and that vacuum will normally hold the uncoated surface of the piece of tape 41 against the vacuum block 43. The adhesively-coated surface of that piece of tape will confront, but normally will be held away from, the portions of the strip S1 which move beyond the guide roll 20.

Figure 2:
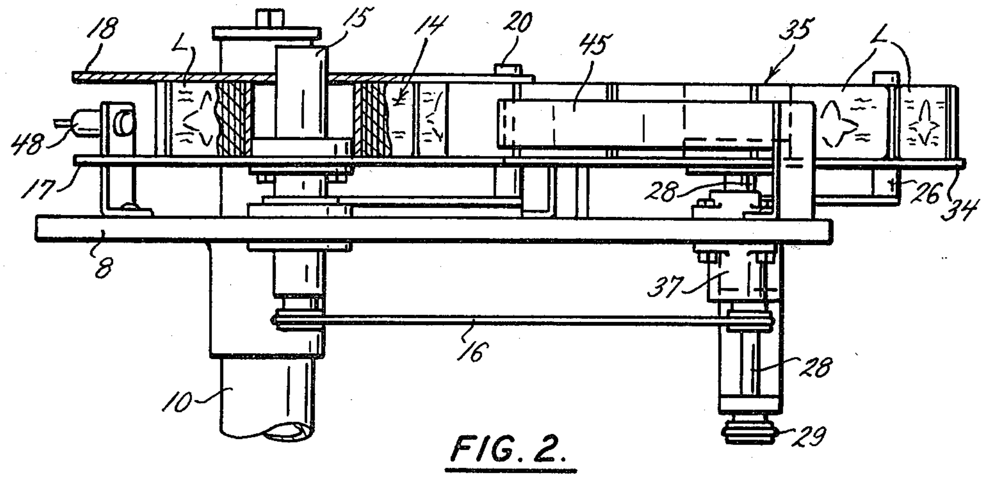
FIG. 2 is an elevational view of a portion of the splicing device shown in FIG. 1 as that device is viewed from the bottom of FIG. 1.

A light source 47 is mounted on the machine near the primary supply roll 14; and it is arranged to send a beam of light past that roll when the diameter of that roll decreases to a size which is close to that of the core of the roll on the shaft 15. However, that beam of light will be obstructed by any portion of the strip S1 as that strip unrolls from the roll 15. A light-sensitive element 48 is disposed on the opposite side of the roll 14 from the light 47, as illustrated in FIG. 1; and it is connected to an electronic control unit 49 that controls the electrical components of the machine.

An air-operated pressure-applying device has a cylinder 50 mounted at the left side of strip S1 with its piston projecting, as shown, toward that strip. That piston also projects toward the vacuum block 43 which is located beyond that strip and which normally holds the piece of tape 41. That cylinder is connected by a pipe 51 and an electrically-operated valve 52 to an air pressure source. That valve is normally closed but can be opened by the electronic control unit 49.

OPERATION

The present apparatus can be added to existing label feeding machines without modifying those machines and without requiring significantly more space. The locating of the supplemental roll 35 adjacent the primary roll 14 saves space, and also enables that supplemental roll to be moved over onto the primary roll spindle 15 without difficulty and without stopping the labelling line. The disposition of the free end of the supplemental tape S2 and the vacuum block 43 within the V-space also saves space, and can be accomplished with minimal changes to the basic machine.

When the primary roll 14 becomes depleted so the light from the light source 47 can pass across to the light-sensitive device 48, the electronic control unit 49 will respond to the resulting signal from that device to open valve 52 to supply compressed air through the pipe 51. Thereupon, the air cylinder 50 will project its piston toward the vacuum block 43, and thus cause the tail of the strip S1 from the roll 14 to be pressed against the adhesively-coated projecting end of the tape 41 that is held by the vacuum block 43, thereby uniting the two strips S1 and S2. A time-delay of known type in the electronic control unit 49 will promptly deenergize the valve 52, despite continued light from light source 47 on the sensor 48; and hence the air pressure will automatically be cut off, and the piston of the cylinder 50 will automatically return to its rest condition.

The vacuum from the vacuum block 43 will be strong enough to normally hold the piece of coated tape 41, but will be weak enough to permit the force applied by feed roll 24 and rewind roll 27 to free that piece of tape from that vacuum block. As a result, the S2 strip will automatically move with the tail of the S1 strip and effectively become a prolongation of that strip. The S2 strip from the supplemental roll 35 will then feed labels to the point 21 and hence to the bottles B. At this time, the top plate 18 and the core of the depleted roll 14 will be removed, and the replacement roll 35 will be lifted off the shaft 36 and moved to the left until it can be telescoped onto the shaft 15 in place of the roll 14. The top plate 18 will then be replaced; and the roll 35 will then become the primary roll 14, and another supplemental roll 35 will be placed over the shaft 36 and have the piece of tape 41 thereon held by the vacuum block 43. The labelling line will not be stopped during this changeover.

The label-free backing strip S1 will be cut or broken at a point between pinch roll 25 and guide roll 26; and then the label-free backing strip S1 of the rewind roll 27 will be freed from the shaft 28 and discarded. The cut or torn end, of the label-free backing strip S1 which is intermittently advanced by drive roll 24 and pinch roll 25, will then be secured to shaft 28 to start a further rewind roll 27. The guide roll 26 automatically moved in the clockwise direction in FIG. 1 as it was released by the cutting or tearing of the label-free backing strip S1; and the brake and tension-applying mechanism, associated with that guide roll, automatically freed the shaft 28. Once the cut or torn end, of the label-free backing strip S1, is secured to shaft 28, the guide roll 26 will be moved back to the position of FIG. 1 to again keep that strip taut; and thereafter the tension on that label-free backing strip will hold that guide roll in, or close to, that position.

In the foregoing operation, the light from the light source 47 actuated the light-sensitive element 48 when the tail of the backing strip S1 from the roll 14 moved out of the path of that light. As a result, the present device is responsive to the presence or absence of an obstruction. In the experimental mechanism, in which the photoelectric device was downstream of the vacuum block and was actuated when the last label passed the light, the light beam had to pass through the translucent backing strip and will be bright enough to actuate that photoelectric device. Also, special label-bearing strips had to be ordered, because standard label-bearing strips do not have label-free tail ends. In addition, a light source and a photoelectric device had to be used which would enable that photoelectric device to respond to light transmitted through a label-free backing strip and yet not respond to ambient or scattered light. Also, that experimental mechanism would prematurely splice the primary label-bearing strip to the supplemental label-bearing strip when a label was missing from the backing strip, thereby leaving a large translucent gap in that backing strip. Further that experimental mechanism would prematurely splice the primary label-bearing strip to the supplemental label-bearing strip when the label-peeling device would stop, for a longer-than-usual time, with the light passing through a gap between adjacent labels. With the present invention, those problems are eliminated; because the photoelectric device merely responds to the presence or absence of an obstruction, and it is not sensitive to the presence or absence of a particular label at some point on the label-bearing strip.

It is understood that other pressure-applying devices could be used, such as solenoid-operated devices, to take the place of the air cylinder 50.

When the piston of cylinder 50 presses the label-bearing strip S1 into engagement with the tape 41 and thereby causes strip S2 to act as a prolongation of strip S1, the combined thicknesses of those strips will keep the light, of the standard and usual label-detecting device of the label-feeding machine, from detecting the gaps between the last few labels on strip S1. As a result, those labels will be advanced uninterruptedly, rather than irregularly; and hence a bottle or two could have two labels or no labels applied thereto. However, any such bottles would be pulled off of the line by an inspector or a packer, would have those labels pulled off, and then would be replaced on the line for movement toward the label-applying machine.

There are various changes and modifications which may be made to my invention as would be apparent to those skilled in the art. However, any of those changes or modifications are included in the teaching of my disclosure and I intend that my invention be limited only by the scope of the claims appended hereto.

What I claim is:

1. In a label-feeder and splicing machine for use with strips of labels adhered to one side of a backing strip: a supply roll for such labels, a base, a supply roll mounting to hold the supply roll on the base, means to conduct a main label strip from the supply roll along a predetermined path to adjacent a point at a line of products to be labelled; a peeling edge at such point, a tension arm swivelled to the base to engage the tape between the supply roll and the peeling edge, a feed roll adjacent the path back of the peeling edge and adjacent to the other side of the backing strip but spaced therefrom so as not to interfere with travel of the strip, the feed roll being adapted to pull the backing strip around the peeling edge and enable the labels to move to the line of products; a rewind roll to receive the backing strip; the rewind roll being adjacent the other two rolls on the opposite side of the strip to the supply roll, means conducting the backing strip away from the feed roll to the rewind roll at a point spaced from the main label strip so as to provide a space between the main label strip path and the backing strip and rewind roll; a single motor having means to drive the feed roll, the rewind roll and the supply roll intermittently at a constant predetermined linear rate; means to support a supplemental label strip roll adjacent the main roll, means to direct the supplemental strip from the supplemental roll along a path between the supply roll and the rewind roll to adjacent the space between the path of the main label strip and the backing strip, releasable means in the said space to hold the end of the supplemental strip at a point in said space adjacent the main strip but out of contact therewith, the releasable means being downstream from the tension arm; means including a movable pressure-applying device on the other side of the main strip opposite the releasable means, operable to press the strips together for purposes of splicing the end of the supplemental strip and the tail end of the main strip together; sensing means responsive to the absence of the main strip at its tail end to energize the pressure-applying device to cause splicing to occur, including means to quickly cause withdrawal of the pressure-applying device to enable the spliced strip to be fed rapidly, the sensing means being located a distance from the pressure-applying device such that the slicing occurs approximately at the end of the supply strip tail.

2. In a machine for attachment to a label feeder of the kind having a supply roll of labels yieldably adhering to one side of a backing strip, a base, a supply roll mounting to hold the supply roll on the base, means to conduct the strip of labels forwardly from the supply roll along a path to a point adjacent a line of products to be labelled; a peeling edge adjacent said peeling point, a tension arm swivelling mounted on the base and engaging the tape between the supply roll and the peeling edge, a feed roll back from the peeling point and adjacent said path and adjacent to the other side of the backing strip but spaced therefrom so as not to interfere with travel of the strip, and a rewind roll adjacent the path and the feed roll on the opposite side of the strip to the supply roll, means conducting the backing strip away from the feed roll to the rewind roll at a point spaced from the main label strip so as to provide a space between the main label strip path and the backing strip and rewind roll, a single motor having means to drive the supply roll, the feed roll, and the rewind roll, the backing strip from the supply roll along the feed path to the peeling point and back to the feed roll and rewind roll providing a generally V-shaped space enlarged from the feed roll to the rewind roll, the invention comprising a splicing attachment for such machine having a supplemental label strip roll support adjacent the supply roll and rewind roll; means for directing the strip from the supplemental supply roll to the enlarged part of the V-space with its labels on the same side as those on the supply roll strip; a strip holding block in the enlarged part of the V-space between the rewind roll and the path of the supply roll strip downstream of the tension arm, the block being adapted to engage the other side of a supplemental roll strip and hold the initial end of a supplemental roll strip drawn from the supplemental roll into said V-space to said block, a pressure device on the opposite or label containing side of the supply roll strip and the holding block; a control comprising sensing means at the supply roll and upstream from the pressure device operable in response to passage of the end of the supply roll strip from the supply roll, and means responsive to such operation of the sensing means to actuate the pressure device to press the end of the supply roll tape against the initial end of the supplemental strip to splice them together, and to release them rapidly so as not to impede feeding of labels to the product line, the supplemental roll being movable to the supply roll mounting when the supply roll has been removed, such movement causing the new strip to engage around the tension arm.

3. The attachment of claim 2, wherein the stripholding block is a vacuum device, and the pressure device is an air cylinder arrangement.

4. The attachment of claim 2, wherein the label feeder to which the invention is applied has the single motor driving means to rotate the feed roll and the rewind roll, and wherein the splicing attachment is operable during driving of said rolls.

* * * * *